Aug. 18, 1931.   L. J. McKONE   1,819,784
CONNECTING ROD STRUCTURE
Filed Sept. 17, 1927
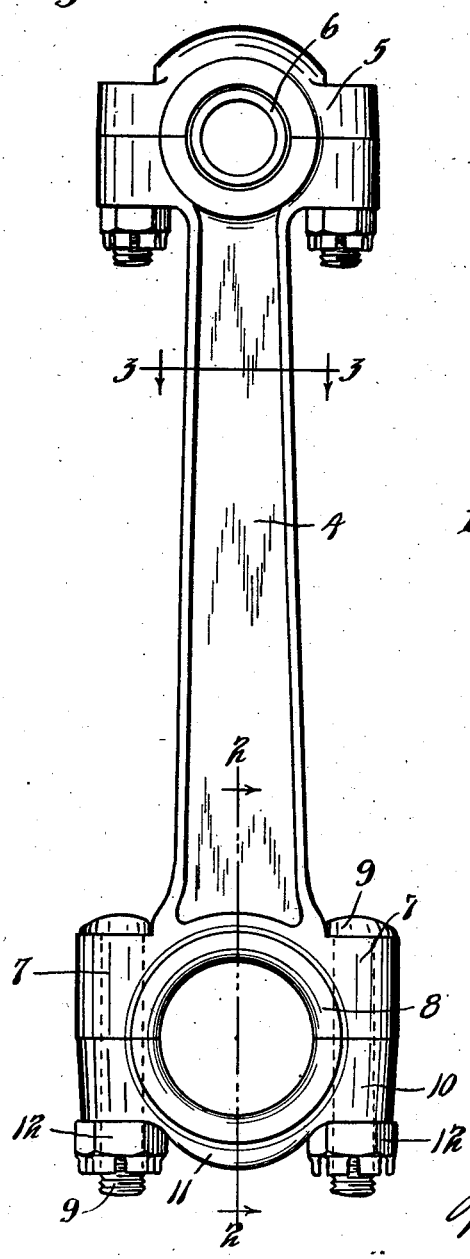
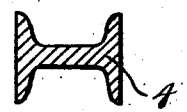
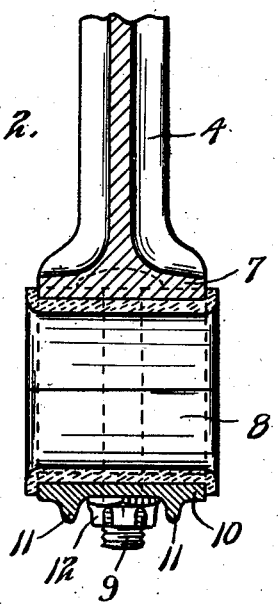
INVENTOR.
LEO J. McKONE.
BY HIS ATTORNEYS
Williamson Leigh & Williamson Patented Aug. 18, 1931

1,819,784

UNITED STATES PATENT OFFICE

LEO J. McKONE, OF MINNEAPOLIS, MINNESOTA

CONNECTING ROD STRUCTURE

Application filed September 17, 1927. Serial No. 220,270.

This invention relates to cap bearing constructions and particularly to cap bearings of the type now commonly used on the connecting rods of internal combustion engines. Connecting rods made form aluminum or similar light material are now widely used in such engines and the babbitt bushing embracing the crank shaft is commonly received by a cap bearing formed entirely from aluminum or similar light material. As is known, aluminum has a high coefficient of expansion relative to the coefficient of expansion of steel or iron and babbitt. It is accordingly found, when an all aluminum connecting rod is used, that the aluminum expands so much on becoming hot that there is play between the rod and the babbitt bushing which surrounds the crank shaft and as a result the bushing is often cracked or otherwise damaged. Normally, there is some .001 to .003 play left in the bearing between the bushing and the crank shaft. The aluminum bearing when heated could run with much less play but if the fit is made much closer than .001 the connecting rod will contract so much in cold weather that it will grip the crank shaft and the shaft will not turn in the bearing.

It is accordingly the object of this invention to provide a connecting rod having the body portion formed from aluminum or similar light metal having a high coefficient of expansion and a cap adapted to form a bearing with one end of the connecting rod and formed from steel or other metal having a low coefficient of expansion relative to the coefficient expansion of the material forming the body portion of the connecting rod.

It is more broadly the object of this invention to provide a cap bearing including a main portion adapted to partially embrace a babbitt bushing and composed from light material having a relatively high coefficient of expansion and a cap secured to said body portion and adapted to embrace the other portion of the babbitt bushing and composed from a metal having a relatively low coefficient of expansion.

More specifically it is the object of this invention to provide a connecting rod for internal combustion engines having a main body portion formed from aluminum and having one end thereof receiving a babbitt bushing which embraces the crank shaft, and a steel cap secured to said end and also embracing the said bushing.

These and other objects and advantages of the present invention will more fully appear from the following description made in connection with the accompanying drawings, wherein like reference characters refer to the same or similar parts throughout the various views, and in which, Fig. 1 is a view in side elevation of a connecting rod embodying the present invention;

Fig. 2 is a vertical section taken on the line 2—2 of Fig. 1, as indicated by the arrows, and Fig. 3 is a horizontal section taken on the line 3—3 of Fig. 1, as indicated by the arrows.

Referring to the drawings, a connecting rod is illustrated including the main portion 4 formed from aluminum and of I beam construction. A cap 5 of aluminum or steel is bolted to the upper end of the portion 4 and is adapted to embrace the wrist pin 6. The upper construction of the connecting rod is preferably made in conformity to my patent on "Connecting rod structure" to be issued September 27, 1927, Patent No. 1,643,720, or my previous Patent No. 1,491,155, granted to me April 22, 1924, for "Connecting rod and wrist pin for engines" although any desired upper construction may be used. The lower end 7 of the portion 4 is preferably of arch shape to receive the upper half of a babbitt split bushing 8 and the arch shaped portion is provided with the usual vertical bolt holes through which the bolts 9 extend, the said bolts having a plane surface on one edge of their heads adapted to bear against the side edges of portions 4 to prevent turning of the bolts. It will be understood that portion 4 is composed of aluminum so as to provide a light connecting rod. A bearing cap 10 of steel or iron is provided which is adapted to receive the lower portion of the babbitt bushing 8 and to bear against the arch shaped portion 7. Ribs 11 are preferably provided at the lower side of the steel or iron cap 10 to strengthen the same. The usual bolt holes are provided through the steel or iron cap 10 through which the bolts 9 extend and said bolts are secured in place by the usual lock nuts 12, babbitt metal, as is well known, is a soft anti-friction metal.

By use of the steel or iron cap 10, the expansibility of the socket for holding the bushing 8 is greatly reduced over the expansibility of such a socket having an aluminum cap. The play left between the bushing 8 and the crank shaft need be very slight and yet there will be no danger that the socket for the bushing will contract so much when subjected to cold temperatures that the bushing will grip the crank shaft to prevent the turning thereof. Also when the socket is heated, the same will expand but slightly thereby obviating any liability of injury to the bushing due to excessive play between the socket and the bushing or between the bushing and the crank shaft.

It will be understood that the inventor does not wish to limit himself to use of his bearing construction on crank shafts alone. He contemplates use of such a bearing at any place where light metal is used and is subject to variations in temperature. Also the inventor does not wish to limit himself to a main bearing portion composed from aluminum and a cap for the main bearing portion formed from steel or iron. It will be understood that it is within the scope of this invention to substitute for the aluminum any type of light metal having a high coefficient of expansion or to substitute for the iron or steel, any type of metal having a relatively low coefficient of expansion in comparison with the other metal used. Various other changes and modifications may be made without departing from the scope of the present invention, which generally stated consists in the matter shown and described and set forth in the appended claims.

What is claimed is:

1. A bearing adapted to be subjected to varying temperatures comprising a body portion formed from a metal having a high coefficient of expansion, a cap secured to said body portion and formed from a metal having a low coefficient of expansion and a babbitt bushing embraced between said body portion and said cap whereby the expansion and contraction of said body portion and cap about said babbitt bushing are not excessive.

2. A connecting rod for an internal combustion engine having a body portion formed from a light metal having a relatively high coefficient of expansion, a cap secured to said body portion, and a bearing bushing therewith mounted in said cap and body portion, said cap being composed of a metal having a relatively low coefficient of expansion.

3. A connecting rod for an internal combustion engine having a body portion of aluminum material, a detachable cap of iron at one end of said body portion and a bushing embraced by said body portion and cap.

4. A connecting rod for an automobile engine having a piston and a crank shaft comprising a body portion extending from the piston to the crank shaft, a cap removably bolted to the body portion, said body portion of said connecting rod being made of aluminum material and said cap being made of steel and a soft metal bushing embraced by said body portion and cap.

5. A connecting solid rod assembly comprising a rod and upper half bearing formed of aluminum, a cap formed of steel having a coefficient of expansion less than that of said aluminum, and a soft metal bushing embraced by said half bearing and cap whereby the amount of expansion due to heat and cold on said bushing is reduced to prevent excessive tightness of said bearing when cold and looseness of said bearing when heated.

6. A connecting solid rod assembly comprising a rod having an upper half bearing formed of one metal, a cap formed of a different metal having a coefficient of expansion materially different from that of said first mentioned metal and a bushing of anti-friction metal embraced by said half bearing and cap whereby the amount of expansion and contraction on the shaft passing through said bushing is reduced.

7. A connecting rod assembly for an internal combustion engine comprising a body portion of light metal such as aluminum, having a half-bearing at one end, a detachable cap at said end made of heavier metal having a coefficient of expansion different from that of said light metal, and a bushing embraced by said half bearing and said cap and held in place thereby.

8. A connecting rod for an internal combustion engine having a body portion of aluminum metal, a babbitt bushing, one end of said body portion being constructed and arranged to partially embrace said bushing, and a cap of steel secured to said end of said body portion and embracing the other part of said bushing, whereby excessive contraction and expansion about said bushing due to heating and cooling of said rod and cap are prevented.

9. A connecting rod for an internal combustion engine having a body portion formed of aluminum metal, a babbitt bushing embraced by one end of said body portion which is adapted to embrace a crank shaft, and a steel cap secured to said end, also embracing said bushing whereby excessive expansion and contraction about said bushing are prevented.

10. A connecting rod for an internal combustion engine having a body portion of one metal including a half-bearing at its larger end, a detachable cap at said end of a different metal having a coefficient of expansion considerably different from that of said first mentioned metal, and a bushing of babbitt metal embraced by said half-bearing and cap and held in place thereby, said bushing being adapted to receive a shaft.

In testimony whereof I affix my signature.

LEO J. McKONE.